United States Patent [19]

Yelvington

[11] Patent Number: 5,043,855

[45] Date of Patent: Aug. 27, 1991

[54] LIGHT TO ASSIST IN LOCATING A PARTY

[76] Inventor: Dolores Yelvington, 11941 Blasingim Rd., Fort Myers, Fla. 33912

[21] Appl. No.: 481,298

[22] Filed: Feb. 20, 1990

[51] Int. Cl.⁵ ............................................. F21V 3/02
[52] U.S. Cl. ................................... 362/276; 362/367
[58] Field of Search ............... 362/190, 191, 367, 276, 362/253, 802; 340/635

[56] References Cited

U.S. PATENT DOCUMENTS

| | | | |
|---|---|---|---|
| 3,604,914 | 9/1971 | Gibson | 362/191 |
| 4,422,069 | 12/1983 | Edstrom et al. | 362/802 X |
| 4,438,483 | 3/1984 | Gulliksen et al. | 362/191 X |
| 4,535,391 | 8/1985 | Hsiao | 362/191 X |
| 4,631,649 | 12/1986 | McCue et al. | 362/191 X |
| 4,751,623 | 6/1988 | Garner et al. | 362/802 X |
| 4,875,028 | 10/1989 | Chou | 362/367 X |

*Primary Examiner*—Ira S. Lazarus
*Assistant Examiner*—Peggy A. Neils
*Attorney, Agent, or Firm*—Alfred E. Wilson

[57] ABSTRACT

I have devised a distinctively styled light to assist others in locating the whereabouts of a party. This is particularly helpful when an emergency vehicle such as an ambulance has been summoned, or when aid has been requested of the law enforcement personnel through the emergency telephone numbering system. Difficulties are frequently encountered by parties seeking a particular address in areas where the identifying numbers are not well marked or are not marked at all. This is particularly true at night where the streets are poorly lighted or are not lighted at all. If emergency health service is involved such delays can cause serious problems.

I have devised a simple method of making it possible for a driver to locate a particular residence or office without any unreasonable delay. I provide a light having a distinctively styled lamp shade of some sort, such as a pyramid shaped lamp shade having a fixture at the bottom of the unit to receive an electric light bulb, or to receive a flash light for use in rural areas where there is no electricity. The fixture can receive a flashlight bulb and reflector and a housing to receive batteries to energize the flashlight bulb in the electrical fixture. If several people in the same locality adopt my invention and use the same type of lamp shade, other distinctive shapes of lamp shades that are generally similar to the pyramid design can be adopted, such for example as multi-sided lamp shades and cylindrical lamp shades.

1 Claim, 1 Drawing Sheet

LIGHT TO ASSIST IN LOCATING A PARTY

BACKGROUND OF THE INVENTION

Heretofore no readily operable device has been available to assist a party in locating a particular residence, particularly at night in rural areas where the street lighting is inadequate or is non-existent. At such times considerable difficulties are encountered where the street numbers are not adequately lighted, or there are no numbers or lights available. As you attempt to locate a particular number under such conditions the need for this invention becomes apparent, particularly if an ambulance vehicle has been summoned, and the urgency of the patient's condition makes it critical that the ambulance be available promptly.

1. Field of the Invention

The purpose of this invention is to provide a structure which will make it possible for the occupants of an ambulance, or other interested party to readily locate a particular residence without the necessity of making inquiries of people in the general area of the desired residence as to where a particular residence is located, once the general area where the desired residence is located has been found.

2. Description of the Prior Art

A broad State of the Art Search has been conducted. The results of the Search did not reveal any devices comparable to Applicant's device or method by which a particular residence number could be located. The Art developed in the Search was directed primarily to devices to call attention to the fact that the party was using the signaling device in an effort to seek help, such as to advise that a vehicle was out of gas and needed gas, police or medical aid. Some of the patents located in the search were to advise of a certain condition, such as that a party had prevailed in a Bingo game; or to indicate that he was riding a bicycle and intended to make a turn in traffic, and was using an animated hand signal to advise others of that fact. Applicant's invention was not disclosed nor suggested in any way in the Search.

SUMMARY OF THE INVENTION

Briefly summarized my invention is directed to the provision of a distinctively shaped transparent light shade to say, in effect, "here it is," to indicate the identity of the residence that a party has been searching for. A distinctive type of a light shade, such for example as a pyramid shaped shade can be employed to identify the desired residence. A clamping fixture in the bottom of the fixture being provided to receive and being clamped to a light socket to receive a conventional light bulb for use in areas where electric power is available.

In areas where no electric power is available the clamping fixture in the bottom of the framework of the pyramid shaped light can be fitted to receive a flash light assembly. In that case the pyramid shaped light shade with the flashlight housing secured in the base of the assembly can be located on a porch or other suitable area of a home to be illuminated when company is expected. Where this expedient is resorted to a ring at the top of the light is provided to permit hanging the light on any convenient support to permit the use of any desired cylinder type of multi-cell flashlight batteries.

While the use of a pyramid shaped shade is provided for illustrative purposes herein it is of course intended that other distinctively shaped shades can be employed if desired such as square or cylinder shapes.

BRIEF DESCRIPTION OF THE DRAWINGS

In the drawings wherein similar reference characters refer to similar parts throughout the several views.

DESCRIPTION OF THE PREFERRED EMBODIMENT

Figure 1:
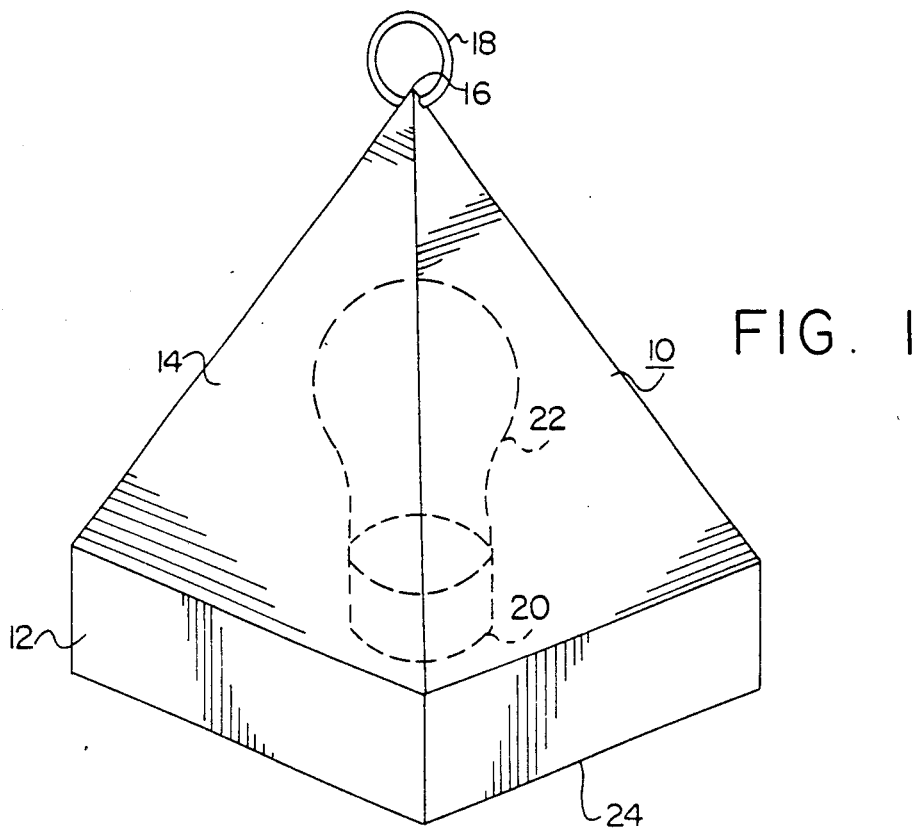
FIG. 1 is a perspective view of a pyramid shaped light shade with a conventional 110 volt light socket for a conventional light bulb to indicate that the desired residence has been located.
Figure 2:
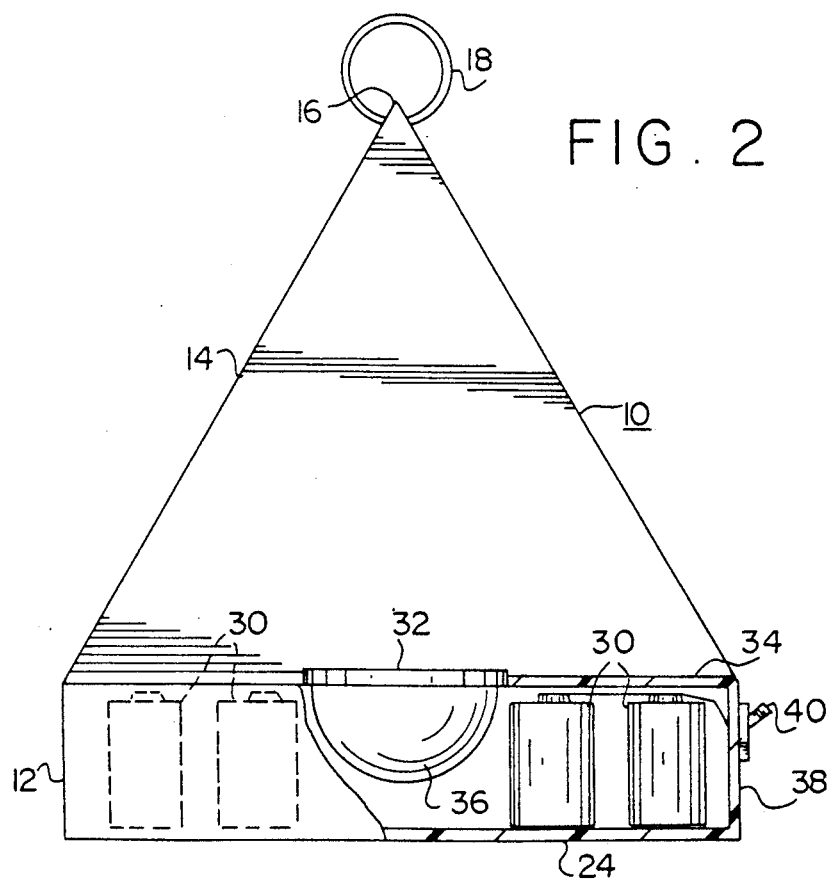
FIG. 2 is a view similar to FIG. 1 wherein a flash light casing is provided to position a flash light to replace the conventional light bulb socket illustrated in FIG. 1 to direct its light into the pyramid shaped shade.

Referring now to the drawings wherein the invention is illustrated as being embodied in a lamp device 10 having a distinctive shape such as a pyramid shaped square base 12 having four triangular shaped side members 14, secured to the base 12 and secured together at the apex 16. A ring 18 is loosely mounted at the Apex 16 so that the unit can be carried thereby and suspended on any article which the ring 18 can encircle.

A light socket 20 is secured within the pyramid shaped shade, and a light bulb 22 is fitted in the socket 20. A bottom plate 24 to which the side members 12 are connected provides a convenient support on which the device can be seated. For use in areas where there is no electric power the bottom wall 24 can support batteries 30 and a light lens 32 of a reflector 36 of a flash light mechanism is positioned in a chamber 38 of the flash light mechanism controlled by a switch 40. Where this expedient is resorted to the unit can be positioned on a porch or other room where the light can be observed from the street.

One important feature of this development is that where the electric light feature of FIG. 1 is employed an automatic hook-up can be made with the emergency telephone number 911 to automatically turn the light 20-22 on when a party is seeking help in an emergency.

The telephone companies are anxious to expand their systems to the fullest to enable them to render better service to their clients. By explaining Applicant's invention to the telephone companies they will realize that this is a system which would augment their services being rendered and would not cause any new problems, and would enable them, the telephone company, to increase their services. Therefore the telephone companies would provide a service charge to be added to their customer's billings for the addition of this service to their customers. The light automatically informs the police on other law enforcement personnel that they have located the party requesting emergency service.

If desired the unit whether electric light or flashlight unit can be hooked into a flasher unit to call attention to the fact that the location desired has been located.

If several parties in a particular locality adopt my improved identity locating device, a different distinctive shape of light shade different from the pyramid shaped shade 10 can be employed such for example as a crown shaped shade or other cylindrical or geometrically distinctive shapes.

In instances where a flashlight is used a plurality of batteries may be available and when a battery in use is run down a freshly charged battery can be installed in the device to extend the life of the device.

I claim:

1. A distinctively styled light to assist others in locating the whereabouts of a party, comprising an electric light, a framework surrounding the electric light, and a distinctively styled permanent lamp shade of a pyramid shape supported by the framework and surrounding the electric light, wherein wiring supplies electric current to the electric light, and wherein an emergency police call 911 is available to patrons having telephone serviced by the wiring, and a connection wherein when the 911 emergency number is called the distinctively styled light is illuminated to assist in locating the party calling 911 emergency number.

* * * * *